UNITED STATES PATENT OFFICE.

GEORGE SCHANZE AND JOHN B. WEIGMAN, OF BALTIMORE, MARYLAND.

ADHESIVE PASTE.

SPECIFICATION forming part of Letters Patent No. 274,979, dated April 3, 1883.

Application filed August 2, 1882. (Specimens.)

*To all whom it may concern:*

Be it known that we, GEORGE SCHANZE and JOHN B. WEIGMAN, both of the city of Baltimore and State of Maryland, have invented certain Improvements in Adhesive Paste, of which the following is the specification.

The object of this invention is to produce a solid adhesive paste which may be softened in water and used for uniting pieces of leather and other substances, after the manner of ordinary flour paste.

In carrying out our invention we take gluten from grain, preferably wheat gluten, dissolved in water, and ferment it in a wooden tub, at a temperature of from 65° to 70° Fahrenheit, for about forty-eight hours. Fermentation usually takes place without any assistant; but should it not commence within a reasonable time, a small quantity of yeast may be added. The material is then thickened with flour, preferably wheat flour, and dried in thin sheets.

To prepare the paste for use the dry substance is steeped in water until it assumes a gelatinous condition, when the surplus water is poured off. The paste, after being stirred, is then fit for use.

It may be necessary to add to the paste, either in the course of its manufacture or after it is prepared, some antiseptic material to prevent disagreeable odor or deterioration arising from putrefaction.

We claim as our invention—

1. An adhesive paste which consists of fermented gluten thickened with flour, substantially as specified.

2. The herein-described process of preparing adhesive paste, which consists in fermenting an aqueous solution of gluten, then thickening it with flour, and then drying the material, substantially as specified.

GEORGE SCHANZE.
JOHN B. WEIGMAN.

Witnesses:
WM. T. HOWARD,
JOHN WILLIAMS.